UNITED STATES PATENT OFFICE.

EUGENE CORNELIUS SULLIVAN, OF CORNING, NEW YORK.

MATERIAL FOR USE IN THE MANUFACTURE OF GLASS.

990,606.     Specification of Letters Patent.     Patented Apr. 25, 1911.

No Drawing.     Application filed July 12, 1909.     Serial No. 507,104.

*To all whom it may concern:*

Be it known that I, EUGENE CORNELIUS SULLIVAN, a citizen of the United States, residing at Corning, county of Steuben, and State of New York, have invented certain new and useful Improvements in Materials for Use in the Manufacture of Glass; and I do hereby declare the following to be a full, clear, and exact description of the invention, such as will enable others skilled in the art to which it appertains to make and use the same.

In the present practice of the manufacture of lead glass, the lead is uniformly introduced into the glass as lead oxid,—either litharge or minium. These are expensive materials and difficult to handle without the formation of dust and consequent injury to the health of the workmen. Some other lead salts have been proposed as substitutes for these oxids, such as lead sulfate, white lead (lead carbonate), and even lead sulfid in connection with sodium sulfate to decompose it. None of these substances, however, have been practically successful, in so far as I am aware.

In an application for Letters Patent of the United States, of even date herewith, I have described a method of incorporating lead into glass in the manufacture of lead glass, by using as the direct source of the lead, the cheap natural lead sulfid or galena (PbS), the most common ore of lead. In carrying out said method, the native lead sulfid ore (galena) is first purified by washing, jigging or other mechanical or chemical operations, so as to remove from it, in particular, any iron minerals associated with it. The purified lead sulfid is then mixed, in proper proportions, with a difficultly fusible material (for instance a substance containing combined or uncombined silica, such as pure sand, or feldspar) of such quality as is suitable for glass making. A mixture of the lead sulfid and silica (or of the lead sulfid and feldspar), both of the required purity for a lead-glass charge (excepting the sulfur present), is then roasted in any suitable form of roasting furnace, at the speed and temperature best adapted for removing the sulfur most completely from the roasted material. I have found, for instance, that by hand roasting a mixture of three parts by weight of pure sand to one part by weight of galena in a reverberatory furnace, at a temperature rising to between 900 and 1000 degrees centigrade, and allowing the roasting material to remain about twenty-four hours in the furnace, with stirring at intervals of one hour, the sulfur remaining has been reduced to 0.05 per cent., furnishing a practically pure lead product, pure enough to satisfy the very exacting requirements of the lead glass maker. The lead-bearing substance, which I thus produce is of a granular, non-dusty and sintered form. The small grains appear to be almost entirely of quartz, with a more or less irregularly distributed "pebble-dash" surface of lead silicate. Some of the grains carry more of silicate than others and the silicate shades into the quartz rather gradually, showing all gradations of concentration. At the outer surface, the silicate is apparently a pure component judging from its refractive index, and the roasted product as a whole appears clean, and sufficiently uniform for the purposes intended.

The lead-bearing substance, produced in accordance with the invention, is mixed with any other material appropriate to lead glass manufacture and the mixture is then fused down to lead glass. I have found that a suitable mixture for the purpose may be compounded of say the sintered lead product 40 pounds, pearlash 5½ pounds, soda 4½ pounds and niter 1 pound.

In compounding and thereafter handling, storing or transporting from one part of the works to another a batch made with lead silicate, the mixture is found to take on and maintain greater uniformity of distribution of the ingredients throughout the mass than when litharge is employed; for the reason, that the specific gravity of the lead silicate more nearly corresponds to that of the remaining constituents.

A further advantage to be gained by the use of lead silicate in the manufacture of lead glass is that it is free from metallic lead, which is present up to one-half of one per cent. and more even in the best commercial litharge, and also to some extent in minium. This metallic lead tends to give the glass a darker color, and, furthermore, it tends to shorten the life of the glass-melting pot by eating through the pot wall.

In manufacturing lead glass containing lime, the lime (used as lime, limestone or gypsum) may be mixed with the silica and lead sulfid and thus participate in the roasting operation. Or the lime, limestone or gypsum alone may be mixed with the lead sulfid and roasted therewith, the silica being introduced later in the glass-fusion operation; or the lime, limestone or gypsum may be excluded from the roasting operation and used only in the final fusion of glass. Such variations fall within the generic principle of the process described in my said co-pending application, which is essentially to roast the lead sulfid thoroughly mixed with a difficultly fusible substance, under test conditions as to purity of the roasted product, and then to use this roasted product in glass making.

The lead-containing material or product itself resulting from the practice of the process, and hereinafter claimed, possesses great advantages as a means of introducing lead into glass. Its powder is practically without deleterious effect upon the workmen. The product dissolves in glass without any chemical decomposition, such as necessarily accompanies the use of lead sulfate, lead carbonate, or lead sulfid and sodium sulfate. Moreover, I have found that my lead-containing material dissolves quickly and uniformly to a more homogeneous lead glass than can be obtained, so far as I am aware, by the use of any of the lead salts or compounds before proposed for use in glass making.

Having thus described my invention, what I claim is:

1. As a new material for use in glass making, the granular, sintered product obtained by dead roasting, to a percentage of not more than about .05 per cent. of sulfur, a mixture of galena and a substance difficultly-fusible at the roasting temperature but suitable to the composition of lead glass; substantially as described.

2. As a new material for use in glass making, a granular substance consisting of fused or sintered lead silicate associated with silica and practically devoid of sulfur; substantially as described.

3. As a new material for use in glass making, a granular substance consisting of fused or sintered lead silicate associated with silica and a calcium compound and practically devoid of sulfur; substantially as described.

4. As a new material for use in glass making, the product obtained by dead roasting a mixture of lead sulfid and silica until the residual sulfur is not more than about .05 per cent.; substantially as described.

5. As a new material for use in glass making, the product obtained by dead roasting a mixture of lead sulfid, silica, and a calcium compound (such as lime, limestone or gypsum) until the residual sulfur is not more than about .05 per cent.; substantially as described.

In testimony whereof I affix my signature, in presence of two witnesses.

EUGENE CORNELIUS SULLIVAN.

Witnesses:
JAMES HOARE,
MICHAEL J. MOORE.